United States Patent
Chang et al.

(10) Patent No.: US 8,508,660 B2
(45) Date of Patent: Aug. 13, 2013

(54) DE-INTERLACING METHODS AND RELATED APPARATUSES

(75) Inventors: Ching-Hua Chang, Taipei Hsien (TW); Po-Wei Chao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1231 days.

(21) Appl. No.: 11/857,430

(22) Filed: Sep. 18, 2007

(65) Prior Publication Data
US 2008/0068498 A1 Mar. 20, 2008

(30) Foreign Application Priority Data
Sep. 19, 2006 (TW) ................................ 95134605 A

(51) Int. Cl.
*H04N 11/20* (2006.01)
(52) U.S. Cl.
USPC ............ 348/448; 348/441; 348/452; 348/458
(58) Field of Classification Search
USPC ................. 348/448, 452, 441, 458
See application file for complete search history.

(56) References Cited

U.S. PATENT DOCUMENTS

| | | | |
|---|---|---|---|
| 5,260,782 A | 11/1993 | Hui | |
| 7,423,691 B2 * | 9/2008 | Orlick et al. | 348/448 |
| 2002/0012464 A1 | 1/2002 | Han | |
| 2003/0095205 A1 * | 5/2003 | Orlick et al. | 348/448 |
| 2003/0098925 A1 * | 5/2003 | Orlick | 348/448 |
| 2005/0134730 A1 * | 6/2005 | Winger et al. | 348/448 |
| 2007/0121001 A1 * | 5/2007 | Wang et al. | 348/452 |

FOREIGN PATENT DOCUMENTS

| | | |
|---|---|---|
| TW | 200511828 | 3/2005 |
| TW | 200608782 | 3/2006 |
| TW | 200618608 | 6/2006 |

* cited by examiner

*Primary Examiner* — Jivka Rabovianski
(74) *Attorney, Agent, or Firm* — McClure, Qualey & Rodack, LLP

(57) ABSTRACT

The present invention provides de-interlacing methods and related apparatuses. One of the proposed de-interlacing methods includes edge detection of a target region corresponding to a target position. When the target region is assumed to include an edge that is considered stationary, and if the target position is on a stationary side of the edge, then a pixel value for the target position is generated by inter-field interpolation.

20 Claims, 5 Drawing Sheets

DE-INTERLACING METHODS AND RELATED APPARATUSES

BACKGROUND OF THE INVENTION

1. Field of the Invention

The present invention relates to an image processing technology, and more particularly, to a de-interlacing method and related apparatus.

2. Description of the Prior Art

Image display technologies are approximately divided into two major categories, the interlaced scanning and the progressive scanning. When displaying an image frame, a conventional interlaced scanning scans an odd field of a frame and then the even field, successively. Progressive scanning, which is also regarded as non-interlaced scanning, merges two fields into one frame before scanning all scanning lines of the frame sequentially with a doubled horizontal scanning frequency in order to improve image quality.

When displaying interlaced image data by progressive scanning, a de-interlacing operation is necessary for interpolating a new scanning line between two successive scanning lines of a field. Most conventional de-interlacing methods detect whether field motion or/and frame motion exist in an image data in order to determine whether the image data is in a stationary state. According to the detected result, an operation of inter-field interpolation or intra-field interpolation is then carried out on pixel positions in the image data that require interpolation.

However, a common dilemma is that image data is usually divided into portions including both the stationary state and the dynamic state. For example, when field displacement detection of pixel values between two corresponding fields (corresponding odd fields or corresponding even fields) demonstrates that the image is dynamic, interpolation of the image may result in poor quality if the pixel position that requires interpolation lies in a region that is relatively stationary.

SUMMARY OF THE INVENTION

It is therefore an objective of the present invention to provide a de-interlacing method and related apparatus to improve image quality after de-interlacing.

In one embodiment of the present invention, a de-interlacing method is provided. The de-interlacing method includes detecting whether an edge exists within a target region corresponding to a target position, determining whether an edge is stationary when the target region is detected to include the edge, determining whether the target position is on a stationary side of the edge, and generating a pixel value for the target position by inter-field interpolation when the edge is assumed to be stationary and when the target position is on the stationary side of the edge.

In one embodiment of the present invention, a de-interlacing device is provided. The de-interlacing device includes an edge detector, an image displacement detector, and an interpolation circuit. The edge detector is used for detecting whether an edge exists within a target region corresponding to a target position. The image displacement detector is coupled to the edge detector for determining whether the edge is stationary when the target region is detected to include the edge. The interpolation circuit is coupled to the image displacement detector. The interpolation circuit is used for determining whether the target position is located on a stationary side of the edge and for generating a pixel value for the target position by inter-field interpolation when the edge is assumed to be stationary and when the target position is on the stationary side of the edge.

In another embodiment of the present invention, a de-interlacing method is provided. The de-interlacing method includes detecting whether an edge exists within a target region corresponding to a target position, detecting whether an image displacement exists in the target position and in a plurality of pixels adjacent to the edge when the target region is detected to include the edge, and generating a pixel value for the target position by inter-field interpolation when the target position and the plurality of pixels are assumed to include no image displacement. The target position and the plurality of pixels are located at the same side of the edge.

These and other objectives of the present invention will no doubt become obvious to those of ordinary skill in the art after reading the following detailed description of the preferred embodiment that is illustrated in the various figures and drawings.

DETAILED DESCRIPTION

Please note that the embodiments of the de-interlacing method and de-interlacing devices to be disclosed in the following paragraphs are meant to be adapted for a variety of applications, including motion adaptive de-interlacing and motion compensation de-interlacing. Furthermore, the mentioned pixel value may be a value of luminance, chrominance, or any other values provided for performing de-interlacing operations.

Figure 1:
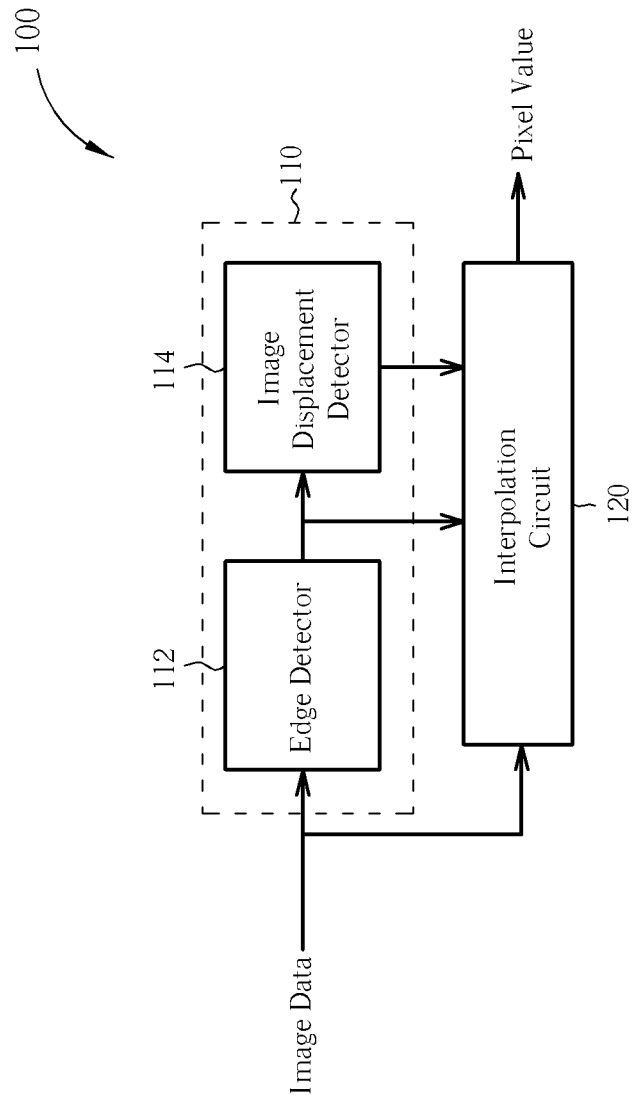
FIG. 1 shows a block diagram of a de-interlacing device after simplification in accordance with one preferred embodiment of the present invention.

Please refer to FIG. 1. FIG. 1 shows a block diagram of a de-interlacing device 100 after simplification in accordance with one preferred embodiment of the present invention. As shown in FIG. 1, the de-interlacing device 100 includes a stationary edge detection device 110 and an interpolation circuit 120. The stationary edge detection device 110 detects whether a region in an image corresponding to a pixel position to be interpolated includes a stationary edge. The interpolation circuit 120 performs a corresponding interpolation operation according to a result detected by the stationary edge detection device 110. In this embodiment, the stationary edge detection device 110 includes an edge detector 112 and an image displacement detector 114.

Figure 2:
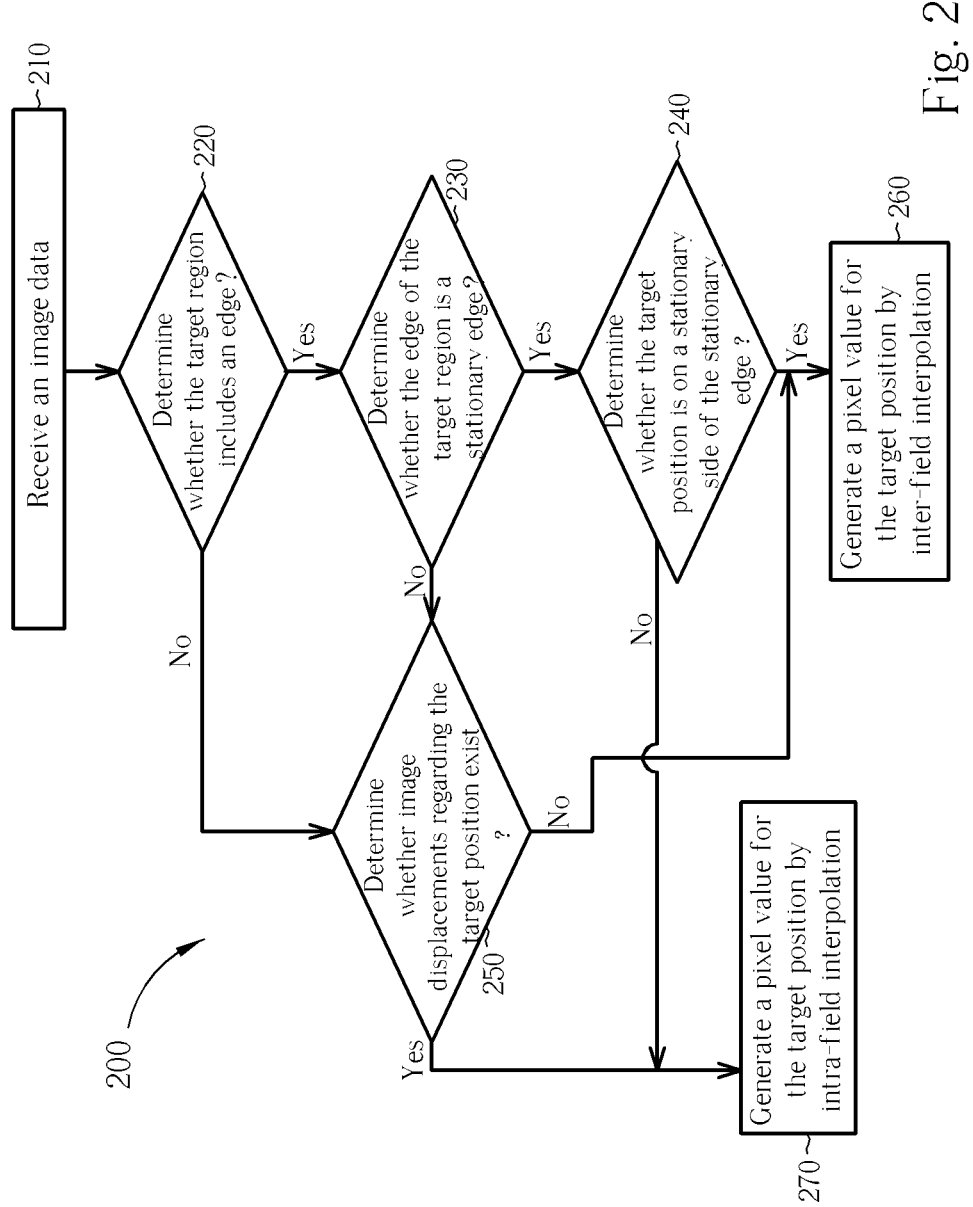
FIG. 2 is a flow chart illustrating a de-interlacing method according to a first embodiment of the present invention.

FIG. 2 is a flow chart 200 illustrating a de-interlacing method according to a first embodiment of the present invention. The flow chart 200 is collocated with the block diagram of the de-interlacing device 100 for further detailed descriptions of operating manners.

Figure 3:
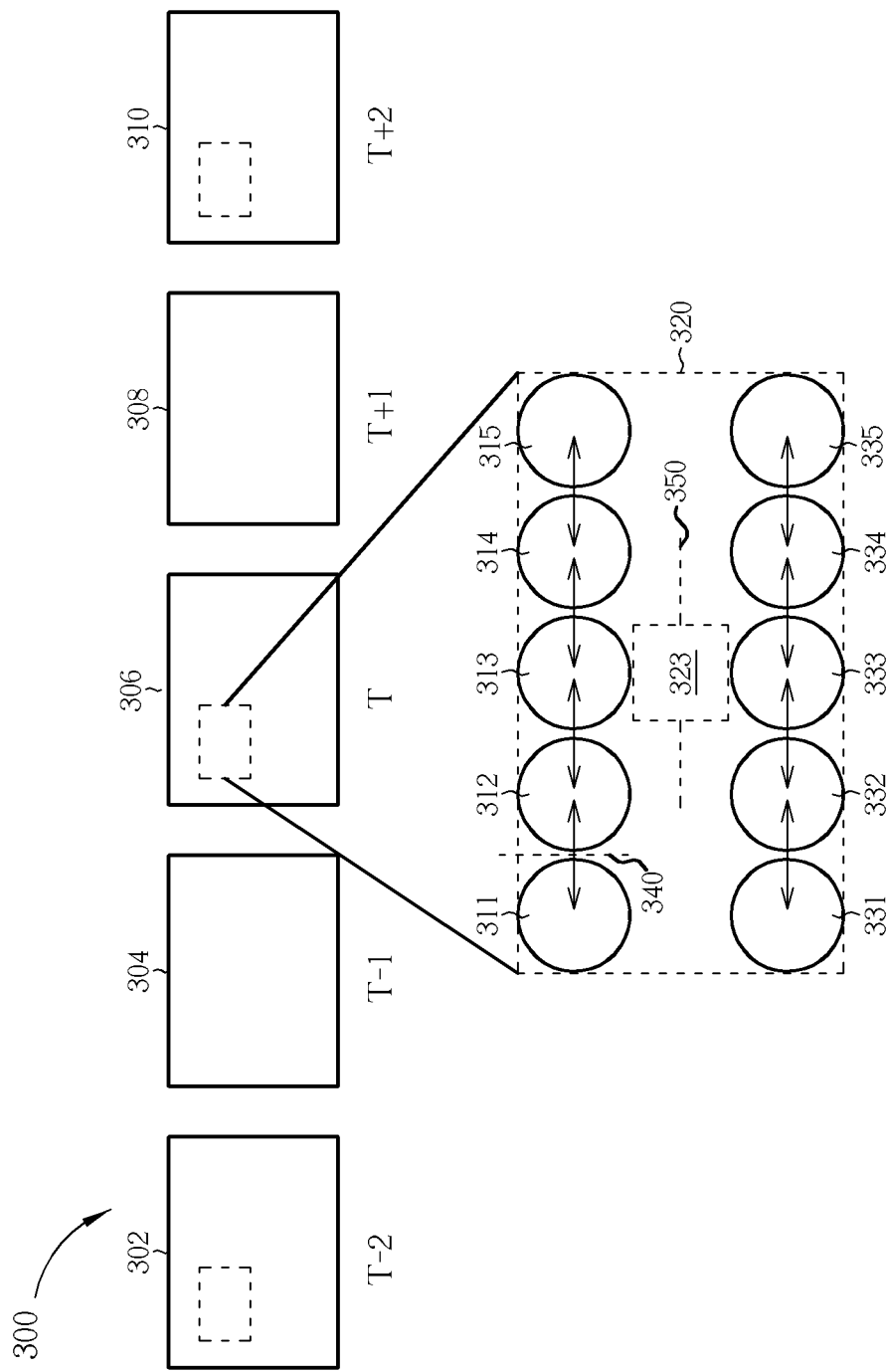
FIG. 3 is a diagram of an image data.
Figure 4:
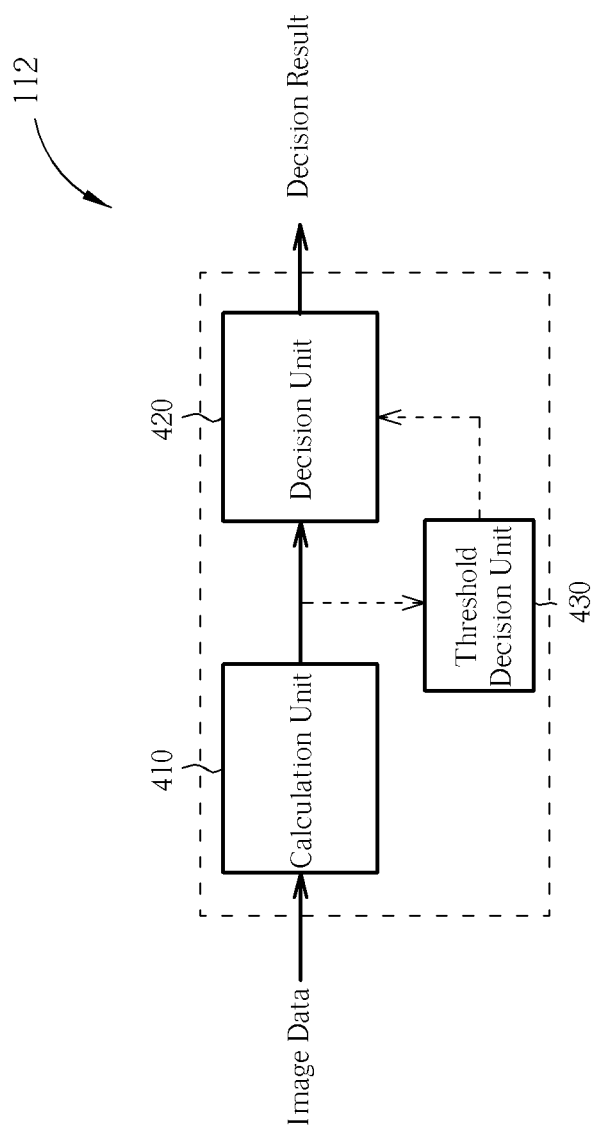
FIG. 4 is a diagram of an embodiment of the edge detector in FIG. 1.

In step 210, the edge detector 112 of the stationary edge detection device 110 receives an image data. An edge detection is performed on a region corresponding to a target position of pixels to be interpolated in the image data, and then the detected result is transmitted to the image displacement detector 114 and to the interpolation circuit 120. Please refer to FIG. 3 and FIG. 4. FIG. 3 is a diagram of an image data 300, and FIG. 4 is a diagram of an embodiment of the edge detector 112 in FIG. 1. As shown in FIG. 3, the image data 300 includes five successive fields 302, 304, 306, 308, and 310, which respectively correspond to times T−2, T−1, T, T+1, and T+2. As shown in FIG. 4, the edge detector 112 in this embodiment includes a calculation unit 410 and a decision unit 420. For the purpose of convenience, a position 323 is assumed as a target position of the pixel to be interpolated by the de-interlacing device 100.

Please keep referring to FIG. 3 and FIG. 4. The calculation unit 410 calculates detection values according to pixel values of pixels located at both sides of the target position 323 in step 210, where each detection value corresponds to a difference between the pixel values of two pixels. The decision unit 420 compares the detection values with a threshold value individually to determine whether the pixels located at the two sides of the target region 320 include an edge or not. For example, the calculation unit 410 can select a target region 320 composed of pixels (such as the pixels 311, 312, 313, 314, 315, 331, 332, 333, 334, and 335 shown in FIG. 3) located in a previous scanning line and a following scanning line regarding the target position 323 of the field 306. An SAD (summation of absolute difference) of pixel values of two adjacent pixels among the aforementioned pixels in the target region 320 is calculated to generate the detection values. In this embodiment, the calculation unit 410 will generate eight detection values, which correspond to the pixel differences between the pixels 311 and 312, 312 and 313, 313 and 314, 314 and 315, 331 and 332, 332 and 333, 333 and 334, and 334 and 335.

Subsequently, the decision unit 420 will compare the abovementioned eight detection values with a threshold value TH. In one embodiment, the decision unit 420 will assume that the target region 320 includes an edge if one of the eight detection values exceeds the threshold value TH. For example, if the pixel difference between the pixels 311 and 312 exceeds the threshold value TH, the decision unit 420 will assume that the target region 320 includes a vertical edge 340. If all the eight detection values do not exceed the threshold value TH, the edge detector 112 in this embodiment will further detect whether the target region 320 includes other edges regarding other directions. For example, the edge detector 112 includes the calculation unit 410 and the decision unit 420, where the calculation unit 410 calculates the pixel difference between the pixels 313 and 333 in the vertical direction, and the decision unit 420 compares the pixel difference between the pixels 313 and 333 with the threshold value TH to determine whether the target region 320 includes a horizontal edge 350. The edge detector 112 can also utilize similar manners to determine whether the target region 320 includes other image edges in other directions. For example, the edge detector 112 can determine whether the target region 320 includes an edge in the diagonal direction by comparing the pixel difference between the pixels 312 and 334 with the threshold value TH or by comparing the pixel difference between the pixels 314 and 332 with the threshold value TH.

In practice, the threshold value TH used by the decision unit 420 in step 210 can be a fixed value or a variable that is adjusted dynamically. For example, in a preferred embodiment, the edge detector 112 further includes a threshold decision unit 430 coupled to the calculation unit 410 and to the decision unit 420 for calculating the threshold value TH according to the detection values generated by the calculation unit 410 in step 210. For example, the threshold decision unit 430 can calculate an average value of the maximum and minimum of detection values as the threshold value TH.

In step 220, the edge detector 112 will determine whether the target region 320 includes an edge according to the detection results of step 210. If the edge detector 112 assumes that the target region 320 includes an edge, the de-interlacing device 100 proceeds to step 230. If the edge detector 112 assumes that the target region 320 includes no edges, the de-interlacing device 100 proceeds to step 250. Please note that the edge detection methods are not limited to abovementioned embodiments. In practice, the edge detector 112 can utilize other approaches to determine whether the target region 320 includes edges.

In step 230, the image displacement detector 114 incorporated in the stationary edge detection device 110 will determine whether the edge of the target region 320 is a stationary edge. If the edge of the target region 320 is assumed to be stationary, the de-interlacing device 100 proceeds to step 240; otherwise, the de-interlacing device 100 proceeds to step 250. In one embodiment, the image displacement detector 114 will determine whether at least one side of the image edge is stationary. If any side of the image edge is assumed to be stationary, the image displacement detector 114 will assume that the image edge is a stationary edge. For example, the image displacement detector 114 may detect the image displacement of pixels adjacent to the edge that are located at the same side of the image edge. If the pixels are assumed to be stationary pixels, the image displacement detector 114 will conclude that the image located at the side of the edge is the stationary image and that the edge is a stationary edge. The abovementioned image displacement detection performed by the image displacement detector 114 may be a field displacement detection, a frame displacement detection, or both. Methods for performing a displacement detection on particular pixels are plentiful and are omitted herein for brevity.

In this embodiment, the target region 320 having a stationary edge represents that the target region 320 is located at an edgy part of an image region having a partial motion in an image frame. For example, the target region 320 may be located at an edge of a logo that appears in a particular position of the frame at all times.

In step 240, the interpolation circuit 120 will determine whether the target position 323 is located at a stationary side of the stationary edge. It is found by experimentation that inter-field interpolation is preferable for de-interlacing the edge of an image region with partial motion (such as the abovementioned logo). For example, de-interlacing the edge of the logo by inter-field interpolation can effectively improve flickers of the edge when the logo is shown. Hence, the interpolation circuit 120 proceeds to step 260 and generates the pixel value for the target position 323 by inter-field interpolation if the target position 323 is located at the stationary side of the stationary edge; otherwise, the interpolation circuit 120 proceeds to step 270 and generates the pixel value for the target position 323 by intra-field interpolation. Details of both the inter-field interpolation and the intra-field interpolation are well known to those skilled in the art, and are thereby omitted herein.

On the other hand, if the results of the image displacement detector 114 in step 230 shows that all the edges of the target region 320 are not stationary, the image displacement detector 114 will proceed to step 250 to determine whether image displacements (field displacements or frame displacements) regarding the target position 323 exist and will further determine whether to proceed to step 260 or step 270 accordingly. The image displacement detector 114 will indicate the interpolation circuit 120 to proceed to step 260 if the target position 323 is assumed to include no image displacements; otherwise, the image displacement detector 114 will indicate the interpolation circuit 120 to proceed to step 270 if the target position 323 is assumed to include image displacements.

Please note that, in the abovementioned steps 210 and 220, the edge detector 112 can also determine whether the edge of the image in the target region 320 is consistent in a multiple of fields corresponding to different time points. Furthermore in the light of each of the fields, the calculation unit 410 can calculate the detection values according to the pixel values of the pixels within the target region 320. The decision unit 420 can compare the detection values with a threshold value individually to determine whether the target region 320 in the field includes an edge in the image. For example, in one embodiment, the calculation unit 410 will calculate first detection values according to the pixel values of a multiple of first pixels within the target region 320 corresponding to the field 302 at the time T−2. The decision unit 420 will compare the first detection values with a first threshold value configured by the threshold unit 430 individually to determine whether the target region 320 in the field 302 includes an edge in the image. After that, the calculation unit 410 will calculate second detection values according to the pixel values of a multiple of second pixels within the target region 320 corresponding to the field 306 at the time T and the decision unit 420 will compare the second detection values with a second threshold value configured by the threshold unit 430 individually to determine whether the target region 320 in the field 306 includes an edge in the image. Furthermore, the calculation unit 410 will calculate third detection values according to the pixel values of a multiple of third pixels within the target region 320 corresponding to the field 310 at the time T+2 and the decision unit 420 will compare the third detection values with a third threshold value configured by the threshold unit 430 individually to determine whether the target region 320 in the field 310 includes an edge in the image.

Assuming that the target region 320 includes a first edge in the field 302, a second edge in the field 306, and a third edge in the field 310. The decision unit 420 can therefore compare whether the first edge, the second edge, and the third edge locate at the same position in step 220, such that they are consistent within the target region 320 in the fields 302, 306, and 310. In this embodiment, the de-interlacing device 100 will proceed to step 230 when the edge within the target region 320 is consistent in the fields corresponding to different time points; otherwise, the de-interlacing device 100 will proceed to step 250.

Please note that the sequence of each step of the flow chart 200 is only an example, which should not restrict practical implementations of the present invention. For example, step 230 and step 240 can be processed at the same time.

Figure 5:
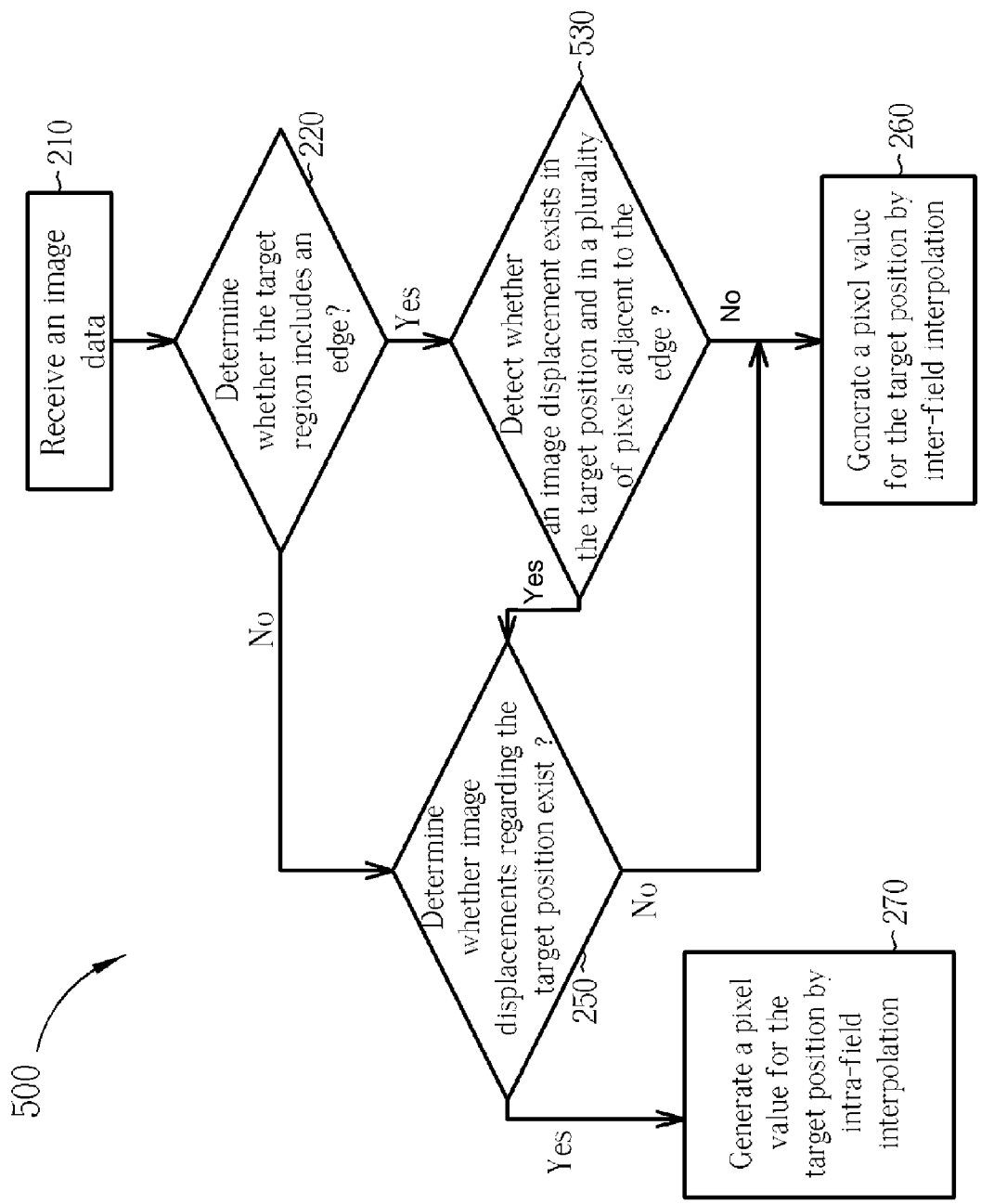
FIG. 5 is a flow chart illustrating a de-interlacing method according to a second embodiment of the present invention.

Please refer to FIG. 5, which is a flow chart 500 of a de-interlacing method illustrated according to a second embodiment of the present invention. The flow chart 500 is similar to the flow chart 200 so the steps with the same implementations are represented by using the same symbols for easy understanding. The difference between the flow chart 500 and the flow chart 200 is that the flow chart 500 merges the abovementioned step 230 and step 240 into a step 530.

In step 530, the image displacement detector 114 will detect the image displacement of the target position 323 and the pixels adjacent to the edge, where the target position 323 and the pixels adjacent to the edge are located at the same side of the edge. The abovementioned displacement detection may be a field displacement detection, a frame displacement detection, or both. If the target position 323 and the pixels are assumed to include no image displacement, the edge will be assumed to be a stationary edge and the target position 323 will be assumed to be located at a stationary side of the stationary edge. Hence, the interpolation circuit 120 will proceed to step 260 and provide inter-field interpolation in order to generate the pixel value of the target position 323.

On the contrary, if the target position 323 or at least one of the pixels aforementioned are assumed to include image displacements, the de-interlacing device 100 will proceed with step 250 and determine whether the target position 323 underwent an image displacement (field displacement or/and frame displacement) to determine whether to proceed to step 260 or step 270. Due to the condition that the image displacement detector 114 has already performed the displacement detection regarding the target position 323 in step 530, step 250 can decide according to previous detection results directly without repeating the same detections.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-interlacing method for a frame, comprising the steps of:
   detecting, by a de-interlacing device, whether an edge exists within a target region corresponding to a target position, the target region comprising a plurality of pixels;
   in response to detection of an edge within the target region, determining whether the edge is stationary;
   in response to determining that the edge is stationary, determining whether the target position is on a stationary side of the edge;
   in response to the target position being on a stationary side of the edge, generating a pixel value for the target position by inter-field interpolation; and
   in response to determining that the edge is stationary and in response to the target position not being on the stationary side of the edge, generating a pixel value for the target position by intra-field interpolation.

2. The de-interlacing method of claim 1, wherein the step of detecting whether the edge exists within the target region corresponding to the target position comprises:
   calculating a plurality of detection values according to pixel values of a plurality of pixels located at two sides of the target position; and
   comparing the plurality of detection values with a threshold value to determine whether the target region includes an edge;
   wherein each detection value is corresponding to a difference between the pixel values of two pixels among the plurality of pixels.

3. The de-interlacing method of claim 2 further comprising:
   calculating the threshold value according to the plurality of detection values.

4. The de-interlacing method of claim 2, wherein the threshold value is calculated according to a maximum value and a minimum value among the plurality of detection values.

5. The de-interlacing method of claim 1, wherein the step of detecting whether the edge exists within the target region corresponding to the target position comprises:
   determining whether the target region includes an edge that is consistent in a plurality of fields corresponding to different time points.

6. The de-interlacing method of claim 5, wherein the step of determining whether the target region includes the edge that is consistent in the plurality of fields comprises:

calculating a plurality of detection values according to pixel values of a plurality of pixels located at two sides of the target position in each of the plurality of fields; and comparing the plurality of detection values with a threshold value to determine whether the target region in the field includes an edge;

wherein each detection value is corresponding to a difference between the pixel values of two pixels among the plurality of pixels.

7. The de-interlacing method of claim 6 further comprising:

calculating the threshold value according to the plurality of detection values.

8. The de-interlacing method of claim 5, wherein the step of determining whether the target region includes the edge that is consistent in the plurality of fields comprises:

calculating a plurality of first detection values according to pixel values of a plurality of first pixels located at the two sides of the target position in a first field of the plurality of fields;

comparing the plurality of first detection values with a first threshold value to determine whether the target region in the first field includes a first edge;

calculating a plurality of second detection values according to pixel values of a plurality of second pixels located at the two sides of the target position in a second field of the plurality of fields;

comparing the plurality of second detection values with a second threshold value to determine whether the target region in the second field includes a second edge; and comparing whether the first edge is located at the same position as the second edge;

wherein each first detection value is corresponding to the difference between the pixel values of two pixels among the plurality of first pixels;

wherein each second detection value is corresponding to the difference between the pixel values of two pixels among the plurality of second pixels.

9. The de-interlacing method of claim 8 further comprising:

calculating the first threshold value according to the plurality of first detection values; and calculating the second threshold value according to the plurality of second detection values.

10. The de-interlacing method of claim 1, wherein the step of determining whether the edge is stationary comprises:

determining whether the edge has at least one side that is stationary; and determining the edge as a stationary edge if any side of the edge is assumed to be stationary.

11. The de-interlacing method of claim 1, further comprising:

in response to not detecting an edge within the target region, determining whether an image displacement of the target position exists; and based on whether an image displacement exists, generating a pixel value for the target position based on one of intra-field interpolation and inter-field interpolation.

12. A de-interlacing device for a frame, comprising:

an edge detector configured to select a target region and detect whether an edge exists within the target region corresponding to a target position, wherein the target region comprises a plurality of pixels;

an image displacement detector, coupled to the edge detector and configured to determine whether the edge is stationary in response to detection of the edge within the target region; and an interpolation circuit, coupled to the image displacement detector, wherein the interpolation circuit is configured to determine whether the target position is located on a stationary side of the edge in response to determining that the edge is a stationary edge, wherein the interpolation circuit is further configured to generate a pixel value for the target position by inter-field interpolation in response to the target position being on a stationary side of the edge, and wherein the interpolation circuit is further configured to generate a pixel value for the target position by intra-field interpolation in response to determining that the edge is stationary and in response to the target position not being on the stationary side of the edge.

13. The de-interlacing device of claim 12, wherein the edge detector comprises:

a calculation unit configured to calculate a plurality of detection values according to pixel values of a plurality of pixels located at two sides of the target position; and a decision unit, coupled to the calculation unit and configured to compare the plurality of detection values with a threshold value to determine whether the target region includes an edge;

wherein each detection value is corresponding to a difference between the pixel values of two pixels among the plurality of pixels.

14. The de-interlacing device of claim 13, wherein the edge detector further comprises:

a threshold decision unit, coupled to the calculation unit and to the decision unit, for calculating the threshold value according to the plurality of detection values.

15. The de-interlacing device of claim 12, wherein the edge detector is further configured to determine whether the target region includes an edge that is consistent in a plurality of fields corresponding to different time points.

16. The de-interlacing device of claim 15, wherein the edge detector comprises:

a calculation unit configured to calculate a plurality of detection values according to the pixel values of the plurality of pixels located at two sides of the target position in each of the plurality of fields; and a decision unit, coupled to the calculation unit and configured to compare the plurality of detection values with a threshold value to determine whether the target region in the field includes an edge;

wherein each detection value is corresponding to the difference between the pixel values of two pixels among the plurality of pixels.

17. The de-interlacing device of claim 16, wherein the edge detector further comprises:

a threshold decision unit configured to calculate the threshold value according to the plurality of detection values.

18. The de-interlacing device of claim 15, wherein the edge detector comprises:

a calculation unit configured to calculate a plurality of first detection values according to pixel values of a plurality of first pixels located at the two sides of the target position in a first field of the plurality of fields, and further configured to calculate a plurality of second detection values according to pixel values of a plurality of second pixels located at the two sides of the target position in a second field of the plurality of fields; and a decision unit, coupled to the calculation unit and configured to compare the plurality of first detection values with a first threshold value to determine whether the target region in the first field includes a first edge, and further configured to compare the plurality of second detection values with a second threshold value to determine whether the target region in the second field includes a second edge;

wherein each first detection value is corresponding to the difference between the pixel values of two pixels among the plurality of first pixels;

wherein each second detection value is corresponding to the difference between the pixel values of two pixels among the plurality of second pixels.

19. The de-interlacing device of claim 18, wherein the edge detector further comprises:

a threshold decision unit configured to calculate the first threshold value according to the plurality of first detection values and calculate the second threshold value according to the plurality of second detection values.

20. A de-interlacing method for a frame, comprising the steps of:

detecting, by a de-interlacing device, whether an edge exists within a selected target region corresponding to a target position;

in response to detection of an edge within the target region, detecting whether an image displacement exists in the target position and in a plurality of pixels adjacent to the edge, wherein the target position and the plurality of pixels are located at the same side of the edge;

in response to determining that no image displacement exists in the target position and in the plurality of pixels adjacent to the edge, generating a pixel value for the target position by inter-field interpolation;

in response to determining that the target region does not include an edge, determining whether an image displacement of the target position exists; and based on whether an image displacement exists, generating a pixel value for the target position based on one of intra-field interpolation and inter-field interpolation.

* * * * *